United States Patent
Kitajima et al.

(10) Patent No.: US 7,280,147 B2
(45) Date of Patent: Oct. 9, 2007

(54) AUTO FOCUSING APPARATUS AND IMAGE INPUTTING APPARATUS

(75) Inventors: Tomoya Kitajima, Tokyo (JP); Junichi Shinohara, Tokyo (JP); Noriaki Ojima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 833 days.

(21) Appl. No.: 10/452,050

(22) Filed: Jun. 3, 2003

(65) Prior Publication Data
US 2003/0231291 A1 Dec. 18, 2003

(30) Foreign Application Priority Data
Jun. 17, 2002 (JP) .............................. 2002-175297

(51) Int. Cl.
*H04N 5/232* (2006.01)
*G03B 13/00* (2006.01)
*G03B 13/36* (2006.01)

(52) U.S. Cl. ................. 348/345; 348/348; 348/349

(58) Field of Classification Search ............... 348/348, 348/349, 350, 353, 335, 345; 396/89, 104, 396/125, 128
See application file for complete search history.

(56) References Cited

U.S. PATENT DOCUMENTS

| | | | |
|---|---|---|---|
| 4,506,965 A | | 3/1985 | Kitajima et al. |
| 4,518,242 A | * | 5/1985 | Toyama ............ 396/106 |
| 4,592,638 A | * | 6/1986 | Kaneda et al. ........ 396/106 |
| 4,653,885 A | | 3/1987 | Araki et al. |
| 4,720,720 A | | 1/1988 | Araki et al. |
| 4,922,281 A | | 5/1990 | Kitajima |
| 4,947,202 A | | 8/1990 | Kitajima et al. |
| 5,069,543 A | | 12/1991 | Kitajima et al. |
| 5,070,356 A | | 12/1991 | Nakamura et al. |
| 5,150,143 A | | 9/1992 | Ohno et al. |
| 5,192,860 A | | 3/1993 | Shinohara et al. |
| 5,192,964 A | | 3/1993 | Shinohara et al. |
| 5,270,755 A | | 12/1993 | Ohno et al. |
| 5,293,034 A | | 3/1994 | Ohno et al. |
| 5,309,190 A | | 5/1994 | Shinohara et al. |

(Continued)

FOREIGN PATENT DOCUMENTS

JP 1-181287 7/1989

(Continued)

OTHER PUBLICATIONS

Patent Abstracts of Japan, JP 2001-255451, Sep. 21, 2001.

(Continued)

*Primary Examiner*—David Ometz
*Assistant Examiner*—Wanda M. Negrón
(74) *Attorney, Agent, or Firm*—Oblon, Spivak, McClelland, Maier & Neustadt, P.C.

(57) ABSTRACT

An auto focusing apparatus comprises a contrast AF (auto focusing) means (10), an outside light AF means (20), a release button (30), a focusing accurate priority button (40) and control means (50). The control means controls the contrast AF (10) and outside light AF (20) to select a contrast AF operation when the focusing accurate priority button (40) is pressed before the release button (40) is pressed and to select an outside light AF operation when focusing accurate priority button (40) is not pressed before the release button (40) is pressed.

12 Claims, 6 Drawing Sheets

U.S. PATENT DOCUMENTS

| | | | |
|---|---|---|---|
| 5,682,563 A | 10/1997 | Shinohara et al. | |
| 6,900,842 B2 * | 5/2005 | Saito et al. | 348/348 |
| 2003/0231291 A1 | 12/2003 | Kitajima et al. | |

FOREIGN PATENT DOCUMENTS

| | | | |
|---|---|---|---|
| JP | 09080534 A | * | 3/1997 |
| JP | 2001-255456 | | 9/2001 |
| JP | 2001255456 A | * | 9/2001 |

OTHER PUBLICATIONS

U.S. Appl. No. 10/909,397, filed Aug. 2004, Ojima.
U.S. Appl. No. 10/913,549, filed Aug. 9, 2004, Nuno et al.
U.S. Appl. No. 10/870,141, filed Jun. 18, 2004, Shinohara.
U.S. Appl. No. 10/796,036, filed Mar. 10, 2004, Shinohara.
U.S. Appl. No. 10/764,449, filed Jan. 27, 2004, Ojima et al.
U.S. Appl. No. 09/986,880, filed Nov. 13, 2001, Shinohara et al.
U.S. Appl. No. 10/025,803, filed Dec. 26, 2001, Ojima.
U.S. Appl. No. 10/125,483, filed Apr. 19, 2002, Ojima.
U.S. Appl. No. 10/120,369, filed Apr. 12, 2002, Sannoh et al.
U.S. Appl. No. 10/270,314, Oct. 15, 2002, Shinohara et al.
U.S. Appl. No. 10/340,660, filed Jan. 13, 2003, Ojima et al.
U.S. Appl. No. 10/452,050, Jun. 03, 2003, Kitajima et al.

* cited by examiner

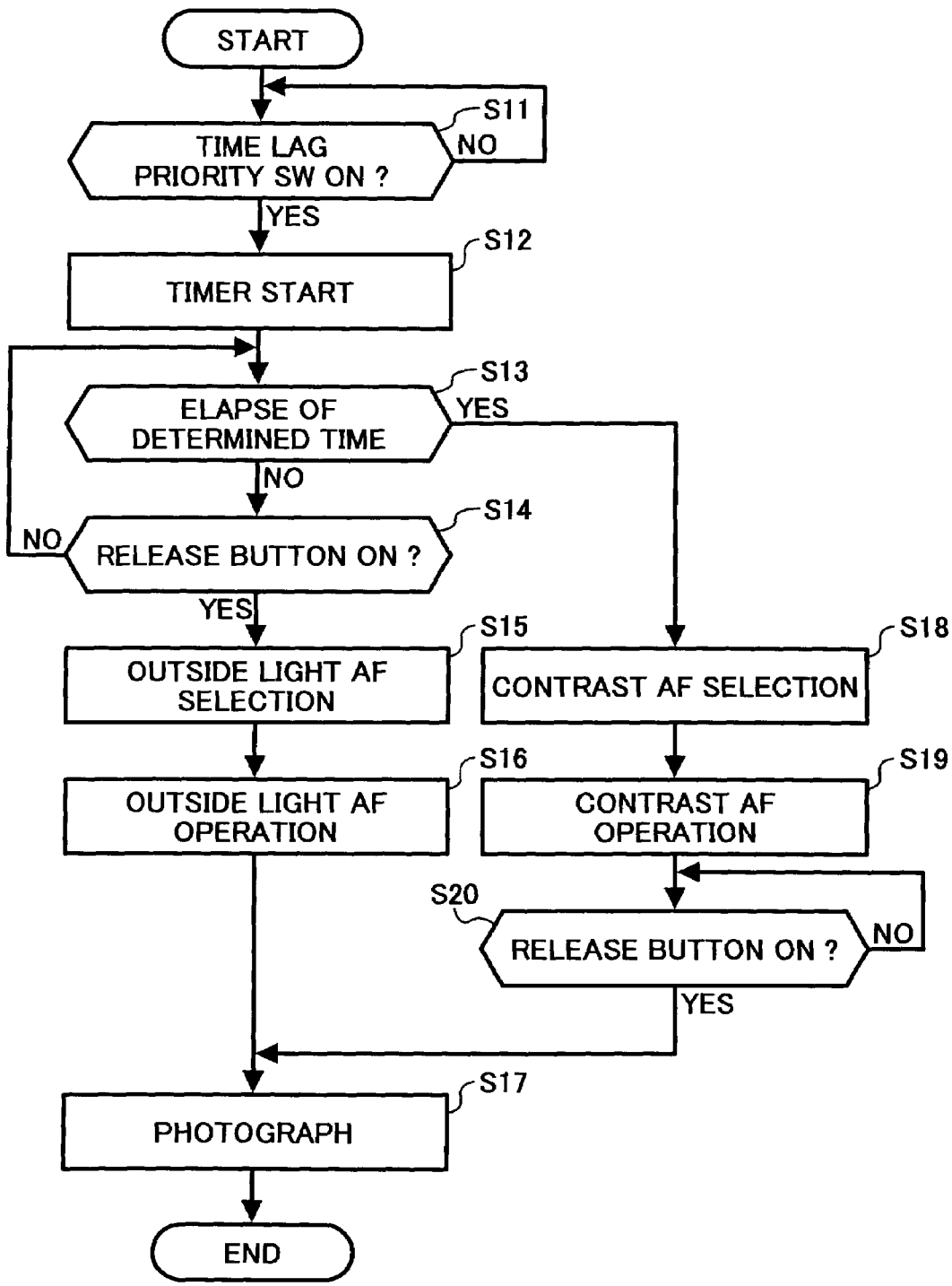

AUTO FOCUSING APPARATUS AND IMAGE INPUTTING APPARATUS

BACKGROUND OF THE INVENTION

1. Field of the Invention

The present invention relates to an auto focusing (AF) apparatus and an image inputting apparatus having the auto focusing apparatus, more specifically, to an improvement in an auto focusing apparatus provided with two auto focus means for carrying out auto focus operations of mutually different kinds.

2. Description of the Prior Art

Conventionally, an image inputting apparatus such as a still camera or video camera is provided with an AF apparatus for adjusting automatically and optimally a focusing state of an image of a subject. An AF apparatus in a typical image inputting apparatus for recording the image of subject on a recording medium such as film, video tape and so on as a photographic image or video picture includes a ranging means and an AF which is referred to as an outside light AF relative to a contrast AF as described hereinafter and which is adopted to control a focus driving means in such a manner that a lens is moved to a focus position corresponding to a distance obtained by the ranging means.

Here, the outside light AF is classified broadly into a passive AF and an active AF in accordance with a difference in a method ranged by the ranging means. The passive AF carries out the ranging based on phase contrast in a plurality of images of subject projected by the ranging means passing through an optical path different from an optical path passing through a photographic optical system and the active AF radiates, for example, near-infrared ray, ultrasound wave or the like to the subject to accomplish the ranging based on time or angle at which a reflected wave on the subject is returned to the ranging means.

On the other hand, in a new image inputting apparatus such as a electronic camera (digital camera) in which the image of subject is projected on an imaging means such as a CCD or CMOS through the photographic optical system and the projected image is taken out as an electric signal, the AF operation can be carried out by use of an image signal since the image is taken out as the image signal simultaneously with the projection of the image of subject.

In other words, in the AF operation, the contrast (sharpness and so on of image) of image projected in the imaging means is evaluated in real time based on the image signal for every movement of a focus lens in the photographic optical system while moving the focus lens, and the movement of the photographic optical system is stopped at the position that the evaluated value is maximum.

This is referred to as a contrast AF or a climbing contrast AF. This is also referred to as CCDAF in case of using a CCD as the imaging means.

The contrast AF has an advantageous effect that focusing accuracy is very high for carrying out AF operation evaluating an image which is actually projected on an imaging means is evaluated without obtaining a distance to the subject.

The more a repeated frequency in a series of operations, which are an accumulation of image, transfer, computation of evaluated value, and comparison, is increased, the more a focusing accuracy can be enhanced, because the contrast AF is carried out while comparing the evaluated value every each moved position of the focus lens.

On the other hand, there is a problem that when the repeated frequency is increased, it takes a long time until a focusing position is determined (completion of AF operation).

If a time (time lag) requiring from initiation of the AF operation to completion thereof is long, there is a case that photograph cannot be carried out at a predetermined timing because the AF operation is completed in a case of exerting important influential circumstance on focusing for the image of subject, for example, photographing a subject which moves at a high speed.

There is a case that in the contrast AF, it is not possible to carry out appropriate focusing operation because clear difference on the evaluated value is not appear in dark circumstance where the entire contrast is low.

On the contrary, the outside light AF is inferior to the contrast AF with respect to the focusing accuracy, but it is possible to follow relatively effectively to a dynamic subject and to prevent photograph timing from losing because the time lag requiring the operation of AF is small.

The outside light AF also has an advantageous effect that it is difficult to affect influence of the contrast of subject, usually.

Therefore, a hybrid AF (HBAF) is proposed, in which two AF means including an AF means carrying out the operation of the outside light AF and an AF means carrying out the operation of the contrast AF are provided to be changeable selectively these AF means in accordance with photograph or subject condition (see Japanese Patent Laid-Open No. 2001-255456).

However, when a user selects one of the AF operations in this technique, a selecting operation must be carried out always before either of the AF operations is selected.

In other words, for example, when a dynamic subject is photographed, a switching means such as a photographing-mode switching dial, switching button or the like is first operated to set the photographing mode into focusing speed priority mode corresponding to the outside light AF and then photographing is carried out.

On the other hand, it is required that when photographing is carried out to obtain accurate focusing, the switching means is first operated to set the photographing mode into focusing accurate priority mode corresponding to the contrast AF and then photographing is carried out.

It is noted that the aforementioned switching method for the AF operation has a good convenience because it is not necessary to carry out operation of switching the photographing mode point by point when multiple times of photographing are carried out continuously while maintaining the same photographing mode.

By the way, for example, during photographing in the focusing accurate priority mode in the AF apparatus, the dynamic subject comes suddenly within the user's range of vision. If the photographing is continued following to the dynamic subject, it is necessary that the user, first, operates the switching means so as to switch the AF operation to the focusing speed priority mode.

However, since the switching operation must be carried out even a case wishing to carry out the photographing by switching suddenly the AF operation, there is the possibility that it is not possible to obtain a desired image due to lose of photographing timing by taking time in the switching operation, lose sight of the subject by averting the user's eyes from the subject because of the switching operation.

SUMMARY OF THE INVENTION

The present invention has been made in view of the aforementioned circumstances and it is therefore an object of the present invention to provide an auto focusing apparatus and an image inputting apparatus (electrical camera or the like) capable of properly switching AF operation to select high speed focusing operation within the range of the normal photographing operation or photographing manipulation without rendering intended additional manipulation to a user in case of a preferable time lag and to select a high accurate focusing operation in case of requiring a high accurate focusing.

To accomplish the aforementioned object, according to an auto focusing apparatus in a first aspect of the present invention, an auto focusing operation for focusing speed priority is established basically, which is switched to an auto focusing operation for focusing accurate priority if photographing manipulation is carried out after a predetermined selecting operation is executed.

More specifically, an auto focusing apparatus in the first aspect comprises: a first auto focusing means for carrying out a first auto focusing operation in which focusing speed is fast relatively between mutually different two auto focusing operations; a second auto focusing means for carrying out a second auto focusing operation in which focusing accuracy is higher relatively between both the auto focusing operations; inputting means for second auto focusing signal in which command for selecting said second auto focusing operation is input; and control means for switching the operations of the first and second auto focusing means to carry out the second auto focusing operation only when the command for selecting is input into the inputting means before photographing.

Here, an auto focusing in which the focusing speed is relatively fast means, for example, typically, an outside light AF such as a passive AF and an active AF, and an auto focusing in which the focusing accurate is relatively high means, for example, typically, a contrast AF or the like.

Because they are relative characteristic between the AF operations of two auto focusing means provided in the auto focusing apparatus, the present invention is not limited to the aforementioned examples, necessarily.

The inputting means for second auto focusing signal may be a mechanical inputting means such as an operational button, an electrical inputting means such as a touch sensor, an optical inputting means such as operation for shutting light, or an acoustic inputting means such as voice.

According to a second aspect of the present invention, an auto focusing operation for moving a focusing lens based on ranging is set basically, if photographic operation is performed after a predetermined selecting operation is performed, the auto focusing operation is switched to an auto focusing operation based on an image signal obtained actually by the focusing lens.

More specifically, an auto focusing apparatus in the second aspect comprises: a first auto focusing means for carrying out a first auto focusing operation in which a distance value is obtained by measuring a distance to a subject and a focusing lens is moved into a focusing position according to the distance value; a second auto focusing means for carrying out a second auto focusing operation in which an image of subject obtained through the focusing lens which is moved is evaluated and the focusing lens is stopped at the focusing position according to the evaluation; inputting means for photographic starting signal in which command for photographic starting is input; inputting means for second auto focusing signal in which command for selecting the second auto focusing operation is input; and control means for switching the operations of the first and second auto focusing means so as to select the second auto focusing operation when the command for selecting is input into the inputting means for second auto focusing signal before the command for photographic starting is input into the inputting means for photographic starting signal and to select the first auto focusing operation when the command foe selecting is not input into the inputting means for second auto focusing signal before the command for photographic starting is input into the inputting means for photographic starting signal.

Here, as means for measuring the distance to the subject, it is possible to apply, specifically, for example, a method (active AF) for illuminating infrared ray or near-infrared ray or ultrasound wave to the subject and for ranging based on an arriving time or arriving angle of reflected light returned from the subject, a method (passive AF) for ranging based on phase difference and so on of a plurality of subject images returned passing through optical paths different from an optical path passing through a photographic optical system or the other known methods.

Obtaining the distance value by measurement of the distance is not limited to obtaining "distance value" itself as physical quantity, means obtaining an angle corresponding to the distance value, for example, in triangular surveying or physical quantity of reflected arriving time and so on of infrared ray or the like, without computing actually the distance value.

Accordingly, if the distance value as physical quantity is not computed, "focusing position according to the distance value" means "focusing position according to the other physical quantity corresponding to the distance value".

As a result, it is possible to apply, so called outside light AF and so on, as such a first auto focusing operation.

Evaluating the subject image obtained through the focusing lens means evaluation of the subject image projected on an imaging means such as a CCD, CMOS or the like, and evaluating the subject image means obtaining an index value or the like (differential value of an image signal) corresponding to the focusing of subject image such as contrast, sharpness of the subject image or the like and obtaining the maximum value of the index value.

In other words, for example, the sharpness of the subject image can be represented with the differential value of image signal with respect to a contour or the like of the subject, when the differential value is maximum, the subject image is properly focused on the imaging means.

It is possible to apply a contrast AF and so on as the second auto focusing operation.

An inputting means for the second auto focusing signal may be mechanical, electrical, optical and acoustic inputting means or the like, similarly as in the first aspect of the auto focusing apparatus as described above.

The inputting means for photographic starting signal may be, for example, a shutter release button or means for operating in response to the shutter release button.

The control means has no need to carry out always either selection of the first and second operations according to whether selected command is input into the inputting means for second auto focusing signal. Because the first auto focusing operation is selected as determinate operation, the control means may perform selection for switching from the first auto focusing operation to the second auto focusing operation only when the selected command is input into the inputting means for second auto focusing signal before a command for photographic starting is input into the inputting means for photographic starting signal.

In an auto focusing apparatus in a third aspect of the present invention, an auto focusing operation for focusing speed priority is set basically, if photographic operation is not carried out within a predetermined time after a predetermined selected operation is performed, the focusing speed priority is switched to auto focusing operation of focusing accurate priority.

More specifically, the auto focusing apparatus comprises: a first auto focusing means for carrying out a first auto focusing operation in which focusing speed is fast relatively between mutually different two auto focusing operations; a second auto focusing means for carrying out a second auto focusing operation in which focusing accuracy is higher relatively between the two auto focusing operations; inputting means for first auto focusing signal in which command for selecting the first auto focusing operation is input; and control means for switching the operations of the first and second auto focusing means to carry out the first auto focusing operation only when said command for selecting is input into the inputting means within a predetermined time before photographing.

Here, with respect to the auto focuses in which the focusing speed is fast and focusing accuracy is high, the same description as in the first aspect of the auto focusing apparatus is applied.

The inputting means for first auto focusing signal may be either of mechanical, electrical, optical, and acoustic inputting means while, it is set to perform operation of inputting a command for selecting the first auto focusing operation into the inputting means for first auto focusing signal, continuously to the photographic operation.

According to an auto focusing apparatus in a fourth aspect of the present invention, if a predetermined selected operation is performed within a predetermined time prior to the photographic operation, the auto focusing apparatus is adapted to switch to an auto focusing operation for moving a focusing lens in a focusing position corresponding to a distance to a subject.

More specifically, the auto focusing apparatus comprises: a first auto focusing means for carrying out a first auto focusing operation in which a distance value is obtained by measuring a distance to a subject and a focusing lens is moved into a focusing position according to said distance value; a second auto focusing means for carrying out a second auto focusing operation in which an image of subject obtained through the focusing lens which is moved is evaluated and the focusing lens is stopped at the focusing position according to the evaluation; inputting means for photographic starting signal in which command for photographic starting is input; inputting means for first auto focusing signal in which command for selecting the first auto focusing operation is input; and control means for switching the operations of the first and second auto focusing means so as to select the first auto focusing operation when the command for photographic starting is input into the inputting means for photographic starting signal within a predetermined time after the command for selecting the first auto focusing operation is input into the inputting means for first auto focusing signal and to select the second auto focusing operation when the command for photographic starting is not input into the inputting means for photographic starting signal within a predetermined time after the command for selecting the first auto focusing operation is input into said inputting means for first auto focusing signal.

Here, definition and interpretation of each of the measurement of distance to the subject, distance value, focusing position corresponding to the distance value, first auto focusing operation, evaluation of the subject image, second auto focusing operation, inputting means for first auto focusing signal and for photographic starting signal are the same as in the auto focusing apparatus in each of the second and third aspects of the present invention.

In addition, the control means has no need to select always either of the first and second auto focusing operations according to whether the command for selecting is input into the inputting means for first auto focusing signal. Because the first auto focusing operation is selected as determinate operation, when the command for photographic starting is not input into the inputting means for photographic starting signal within the predetermined time, or when the command for photographic starting is input into the inputting means for photographic starting signal while the command for selecting is not input into the inputting means for first auto focusing signal, the control means may perform selection for switching from the first auto focusing operation to the second auto focusing operation.

In the auto focusing apparatus in the third or fourth aspect of the present invention, it is preferable to juxtapose the inputting means for first auto focusing signal to the inputting means for photographic starting signal so that the photographic operation by the inputting operation of command for photographic starting to the inputting means for photographic starting signal is performed on extension of the inputting operation of selected command of the first auto focusing operation.

With such a construction, it is possible to perform the inputting of selected command of the first auto focusing operation to the inputting means for first auto focusing signal and the inputting of command for photographic starting to the inputting means for photographic starting signal, as one united continuous operation. Consequently, it is possible to carry out the inputting of command for photographic starting within a very short time from the inputting of selected command of the first auto focusing operation.

Accordingly, even if high speed focusing operation is desired instantaneously, the user can perform the inputting of selected command of the first auto focusing operation by carrying out the inputting operation of command for usual photographic starting without erring the immediate operation by the user. As a result, operationality for the auto focusing apparatus effectively can be enhanced.

In an auto focusing apparatus in a fifth aspect of the present invention, when a command for starting auto focusing operation is input into an inputting means for auto focusing starting signal, first or second auto focusing operation is started temporarily and if photographic operation is performed within a predetermined time after the auto focusing operation is started, auto focusing operation for focusing speed priority is selected.

More specifically, the auto focusing apparatus comprises: a first auto focusing means for carrying out a first auto focusing operation in which focusing speed is fast relatively between mutually different two auto focusing operations; a second auto focusing means for carrying out a second auto focusing operation in which focusing accuracy is higher relatively between the two auto focusing operations; inputting means for auto focusing starting signal in which command for starting the auto focusing operations is input; and control means for switching the operations of the first and second auto focusing means to carry out the first auto focusing operation when the command for starting is input into the inputting means for auto focusing starting signal within a predetermined time before photographing together with starting the first or second auto focusing operation as the command for starting operations is input into the inputting means for auto focusing starting signal.

Here, the auto focusing operation started by the inputting of starting signal into the inputting means for auto focusing starting signal may be the first auto focusing operation or second auto focusing operation, and if it is the first auto focusing operation, the auto focusing operation may be a ranging operation in a prior step of driving actually a focusing optical system and may be an operation in sequence common with both the auto focusing operations.

The inputting means for auto focusing starting signal is set so that operation of inputting the starting command of the auto focusing operation which is input into the inputting means for auto focusing starting signal is continued to the photographic operation. If the temporarily started auto focusing operation and finally performed auto focusing operation are auto focusing operations of a kind, in other words, if each of these auto focusing operations is the first auto focusing operation, or the second auto focusing operation, it is preferable that the finally performed auto focusing operation is executed following to the temporarily started auto focusing operation because time lag until completion of the auto focusing operation can be shortened.

It is preferable that the temporarily started auto focusing operation is the first auto focusing operation. The first auto focusing operation is high speed focusing operation. If the first auto focusing operation is started at the time of commanding the starting of auto focusing operation, by the final selection thereafter, it is possible to response properly to the request of shortening time lag under a photographic condition in which high speed focusing is obtained, than starting initially the first auto focusing operation.

The distance value obtained by a ranging operation which is an initial step in the first auto focusing operation can be utilized in order to narrow down a searched range in searching a focusing position, because even if the first auto focusing operation is switched to the second auto focusing operation by the final selection, it is possible to use effectively the result of the ranging operation.

In an auto focusing apparatus in a sixth aspect of the present invention, when a command for starting auto focusing operation is input into an inputting means for auto focusing starting signal, a first or second auto focusing operation is started temporarily and when photographic operation is carried out within a predetermined time from the operation of starting the above auto focusing operation, auto focusing operation (first auto focusing operation) for moving a focusing lens in a focusing position corresponding to ranging of a distance to a subject is selected.

More specifically, the auto focusing apparatus comprises: a first auto focusing means for carrying out a first auto focusing operation in which a distance value is obtained by measuring a distance to a subject and a focusing lens is moved into a focusing position according to the distance value; a second auto focusing means for carrying out a second auto focusing operation in which an image of subject obtained through said focusing lens which is moved is evaluated and the focusing lens is stopped at the focusing position according to the evaluation; inputting means for photographic starting signal in which command for photographic starting is input; inputting means for auto focusing starting signal in which command for starting the auto focusing operations is input; and control means for switching the operations of the first and second auto focusing means so as to select said first auto focusing operation when the command for photographic starting is input into said inputting means for photographic staring signal within a predetermined time after the command for starting the auto focusing operations is input into the inputting means for auto focusing starting signal and to select the second auto focusing operation when the command for selecting photographic starting is not input into said inputting means for photographic starting signal within a predetermined time after the command for starting the auto focusing operations is input into the inputting means for auto focusing starting signal, together with starting the first or second auto focusing operation as the command for starting the operations is input into the inputting means for auto focusing starting signal.

Here, definition and interpretation of each of the measurement of distance to the subject, distance value, focusing position corresponding to the distance value, first auto focusing operation, evaluation of the subject image, second auto focusing operation, inputting means for photographic starting signal and inputting means for auto focusing starting signal are the same as in each auto focusing apparatus as described above.

In addition, if the temporarily started auto focusing operation and finally performed auto focusing operation are auto focusing operations of a kind, in other words, if each of these auto focusing operations is the first auto focusing operation, or the second auto focusing operation, it is preferable that the finally performed auto focusing operation is executed following to the temporarily started auto focusing operation because time lag until completion of the auto focusing operation can be shortened.

It is preferable that the temporarily started auto focusing operation is the first auto focusing operation. The first auto focusing operation is high speed focusing operation. If the first auto focusing operation is started at the time of commanding the starting of auto focusing operation, by the final selection thereafter, it is possible to response properly to the request of shortening time lag under a photographic condition in which high speed focusing is obtained, than starting initially the first auto focusing operation.

The distance value obtained by a ranging operation which is an initial step in the first auto focusing operation can be utilized in order to narrow down a searched range in searching a focusing position, because even if the first auto focusing operation is switched to the second auto focusing operation by the final selection, it is possible to use effectively the result of the ranging operation.

In addition, in the auto focusing operation in the fifth or sixth aspect of the present invention, it is preferable that the inputting means for auto focusing starting signal is juxtaposed to the inputting means for photographic starting signal so that the photographic operation by the inputting operation of command for photographic starting into the inputting means for photographic starting signal is carried out on extension of the inputting operation of starting command for auto focusing operation.

With such a construction, it is possible to perform the inputting of starting command of the auto focusing operation into the inputting means for auto focusing starting signal and the inputting of command for photographic starting to the inputting means for photographic starting signal, as one united continuous operation. Consequently, it is possible to carry out the inputting of command for photographic starting within a very short time from the inputting of starting command of the auto focusing operation.

Accordingly, even if high speed focusing operation is desired instantaneously, the user can perform the inputting of starting command of the auto focusing operation by carrying out the inputting operation of command for usual photographic starting without erring the immediate operation by the user. As a result, operationality for the auto focusing apparatus effectively can be enhanced.

An image inputting apparatus in a first aspect of the present invention comprises the auto focusing apparatus according to the present invention as described above and means for inputting a predetermined selected operation arranged in a gripped portion of a camera body and so on or the neighborhood of the gripped portion.

More specifically, the image inputting apparatus comprises: an auto focusing apparatus; a gripped portion gripped before using; and inputting means for a second auto focusing signal which is provided on said gripped portion or adjacent said gripped portion.

Here, the image inputting apparatus is an electronic camera (digital camera), the similar digital video camera or the like which takes out an image projected on an imaging means such as, typically, a CCD or CMOS as an electrical signal, but it is not limited to them.

It is preferable that the inputting means for second auto focusing signal is disposed in the opposite side to an inputting means for photographic starting signal, in which a command for starting a photograph is input.

For example, in the case that the image inputting apparatus is the electrical camera, if a finger in the right hand of the user gripping the electrical camera contact with the inputting means for photographic starting signal, the inputting means for second auto focusing signal may be disposed in a range of contacting with a finger in the left hand of the user or a left side of a body of the camera.

In this way, because the inputting means for photographic starting signal and the gripped portion on which the inputting means for second auto focusing signal is mounted are disposed in the right and left of the camera, respectively, it is possible to perform inputting of a signal into the inputting means for photographic starting signal and inputting for selecting command into the inputting means for second auto focusing signal, by means of right and left different fingers, thus preventing an erroneous operation of the camera and enhancing the operationality.

An image inputting apparatus in a second aspect of the present invention comprises the auto focusing apparatus according to the present invention, as described above.

Here, the image inputting apparatus in the second aspect is similar to the image inputting apparatus in the first aspect, as described above.

In addition, in the aforementioned auto focusing apparatus and image inputting apparatus, the control means controls the first and second auto focusing means so that the first auto focusing operation is always carried out after a power source is turned on. The control means may control to perform the first auto focusing operation when the selected command is input into the inputting means for first auto focusing signal, or when the starting command is input into the inputting means for auto focusing starting signal, based on the distance value to the subject at the time that the above commands are input (including right before of the time), in case which, it is possible to further shorten the time of the first auto focusing operation.

In the aforementioned auto focusing apparatus and image inputting apparatus, the control means controls the first and second auto focusing means so that the first auto focusing operation is carried out after the power source is turned on, while, may controls the these auto focusing means to perform the second auto focusing operation by utilizing information (distance or the like to the subject) obtained the first auto focusing operation at the time (including right before of the time) that the auto focusing apparatus or image inputting apparatus satisfies the conditions in case of selecting the second auto focusing operation.

Because a general focusing position is searched by information obtained with the first auto focusing operation (focusing position by the first auto focusing operation), there is high ratio that high accurate focusing position by the second auto focusing operation exists in a range including and the vicinity of the searched general focusing position.

The present invention is also directed to an auto focusing apparatus including first auto focusing means for carrying out a first focusing operation between mutually different two auto focusing operations, second auto focusing means for carrying out a second auto focusing operation in which a focusing accuracy is higher than that of the first focusing operation between the two auto focusing operations, and inputting means for a signal in which a command for selecting the second auto focusing operation is input. Also included is control means for switching the operations of the first and second auto focusing means to carry out the second auto focusing operation when the command for selecting is input into the inputting means before photographing.

Further, the present invention is directed to an image inputting apparatus including imaging means for outputting a projected image of a subject by converting the projected image of the subject into an image signal, a photographic optical system including a focusing lens for projecting the image of the subject on the imaging means, and first auto focusing means for carrying out a first focusing operation between mutually different two auto focusing operations. Also included is second auto focusing means for carrying out a second auto focusing operation in which a focusing accuracy is higher than that of the first focusing operation between the two auto focusing operations, inputting means for a signal in which a command for selecting the second auto focusing operation is input, and control means for switching the operations of the first and second auto focusing means to carry out the second auto focusing operation when the command for selecting is input into the inputting means before photographing.

Consequently, it is possible to eliminate a operational time of the second auto focusing operation by controlling to perform the second auto focusing operation by means of use of the information obtained with the auto focusing apparatus.

BRIEF DESCRIPTION OF THE DRAWINGS

FIG. 6 is a flow chart explaining an operation of the auto focusing apparatus shown in FIG. 4.

DETAILED DESCRIPTION OF THE PREFERRED EMBODIMENTS

Some embodiments of an auto focusing apparatus and an electronic camera as one example of an image inputting apparatus according to the present invention will be explained in detail with reference to the accompanying drawings below.

Embodiment 1

Figure 1:
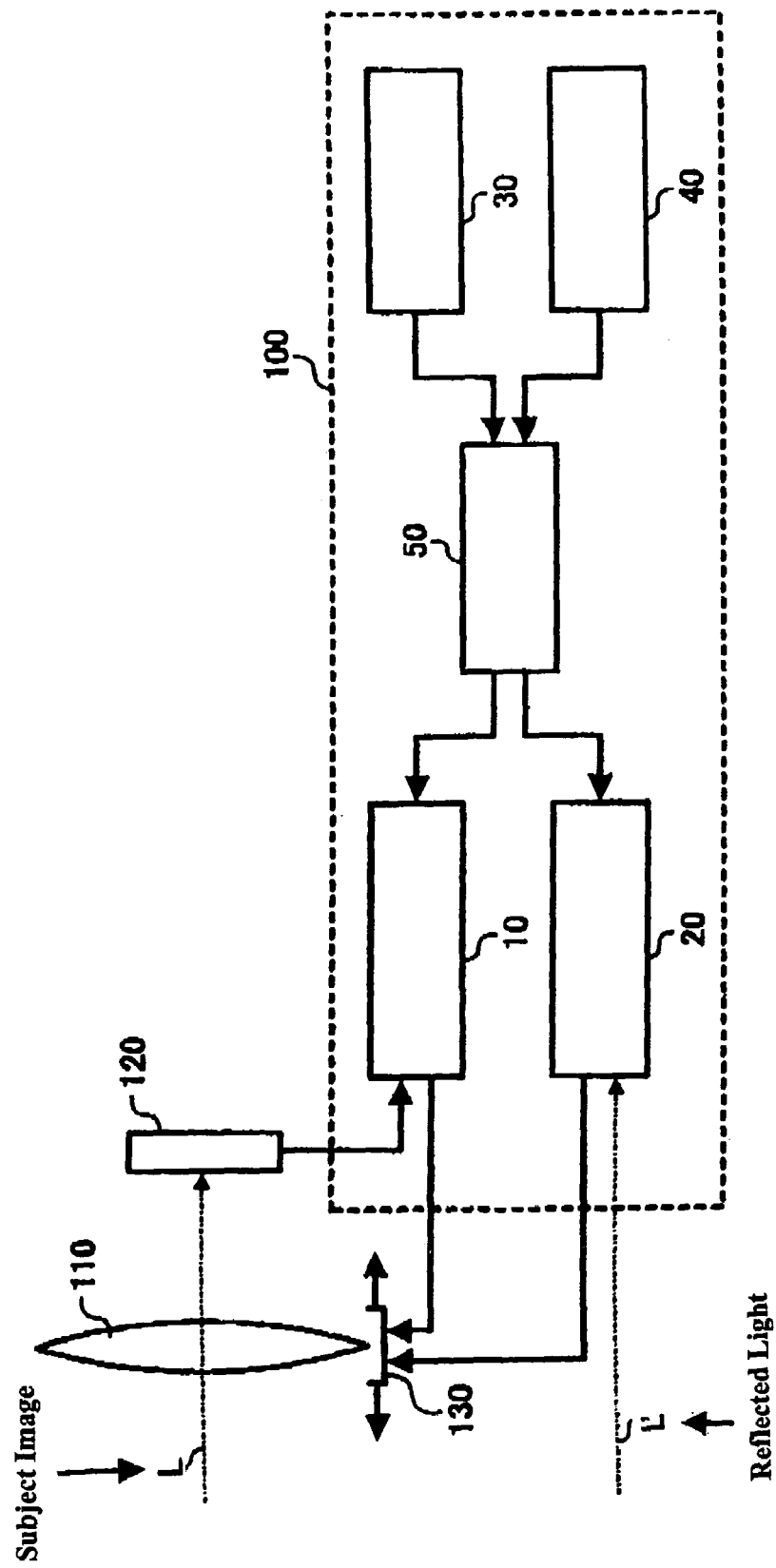
FIG. 1 is a block view showing one embodiment of an auto focusing apparatus in first and second aspects according to the present invention.

An auto focusing apparatus 100 as shown in FIG. 1 comprises a contrast AF (auto focusing) means 10, an outside light AF means 20, a release button 30, a focusing accurate priority button 40 and control means 50.

Here, the contrast AF means 10 is composed of an AF mechanism in which a focusing lens 110 in an electronic camera 200 on which the auto focusing apparatus 100 is mounted is being moved, an image signal of a subject image L (not shown) projected on a CCD (charged coupled device) 120 through the focusing lens 110 is evaluated sequentially and then the focusing lens 110 is stopped at a focusing position based on the evaluation.

In other words, a contrast AF operation is accomplished in which contrast of the subject image L is obtained sequentially based on the image signal and the focusing lens 110 is stopped in a position at which the contrast is maximum, namely, the subject image L is focused on the CCD 120.

On the other hand, the outside light means performs an outside light AF operation in which infrared light is projected on a subject to measure a distance to the subject based on a reflected light L' on the subject, and a position of the focusing lens at which the subject image positioned in the distance obtained is focused on the CCD 120 is obtained, and then the focusing lens 110 is moved to the obtained position.

In the two AF operations, the outside light AF operation is fast relatively in focusing speed, but is low relatively in focusing accuracy, as compared with the contrast AF operation.

Each of the contrast AF means 10 and outside light AF means 20 outputs a command signal of movement/stop to a stepping motor 130 which moves or stops the focusing lens 110 along the optical axis to control the movement and stopping of the focusing lens 110.

Figure 2:
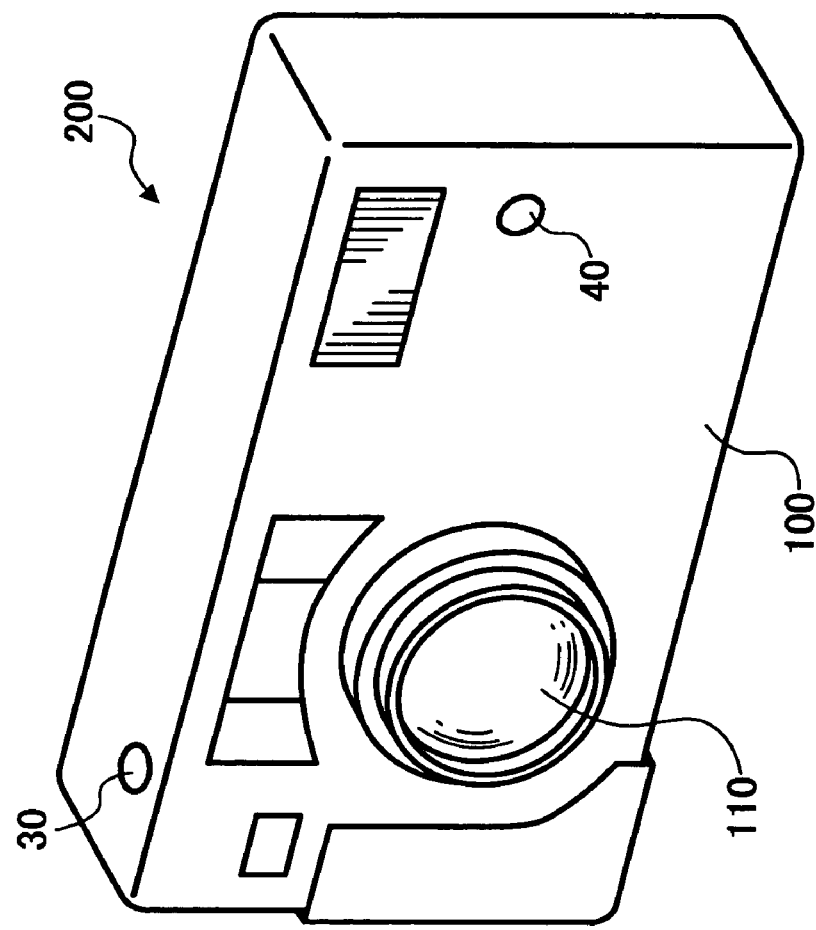
FIG. 2 is a view showing an electronic camera including the auto focusing apparatus shown in FIG. 1.

The release button 30 is placed in a position of an upper surface and right of center in the electronic camera 200 as shown in FIG. 2 and which is easy to press with the second finger of the right hand of a user who grips the electronic camera 200 to input a command (photographic starting signal) for starting photograph by pressing of the user.

The focusing accurate button priority button (inputting means for second auto focusing signal) 40 is placed in a position which is front surface and left of center of the electronic camera 200 and which is easy to press with the second finger of the left hand of the user who grips the electronic camera 200 to input a command for selecting the contrast AF operation by pressing of the user.

The control means 50 controls the contrast AF means 10 and outside light AF means 20 so as to select the contrast AF operation when the focusing accurate priority button 40 is pressed before the release button 30 is pressed, namely, when the release button 30 is pressed after the focusing accurate priority button 40 is pressed and to select the outside light AF operation when the focusing accurate priority button 40 is not pressed before the release button 30 is pressed, namely, when the focusing accurate priority button 40 is not pressed and the release button 30 is pressed.

Figure 3:
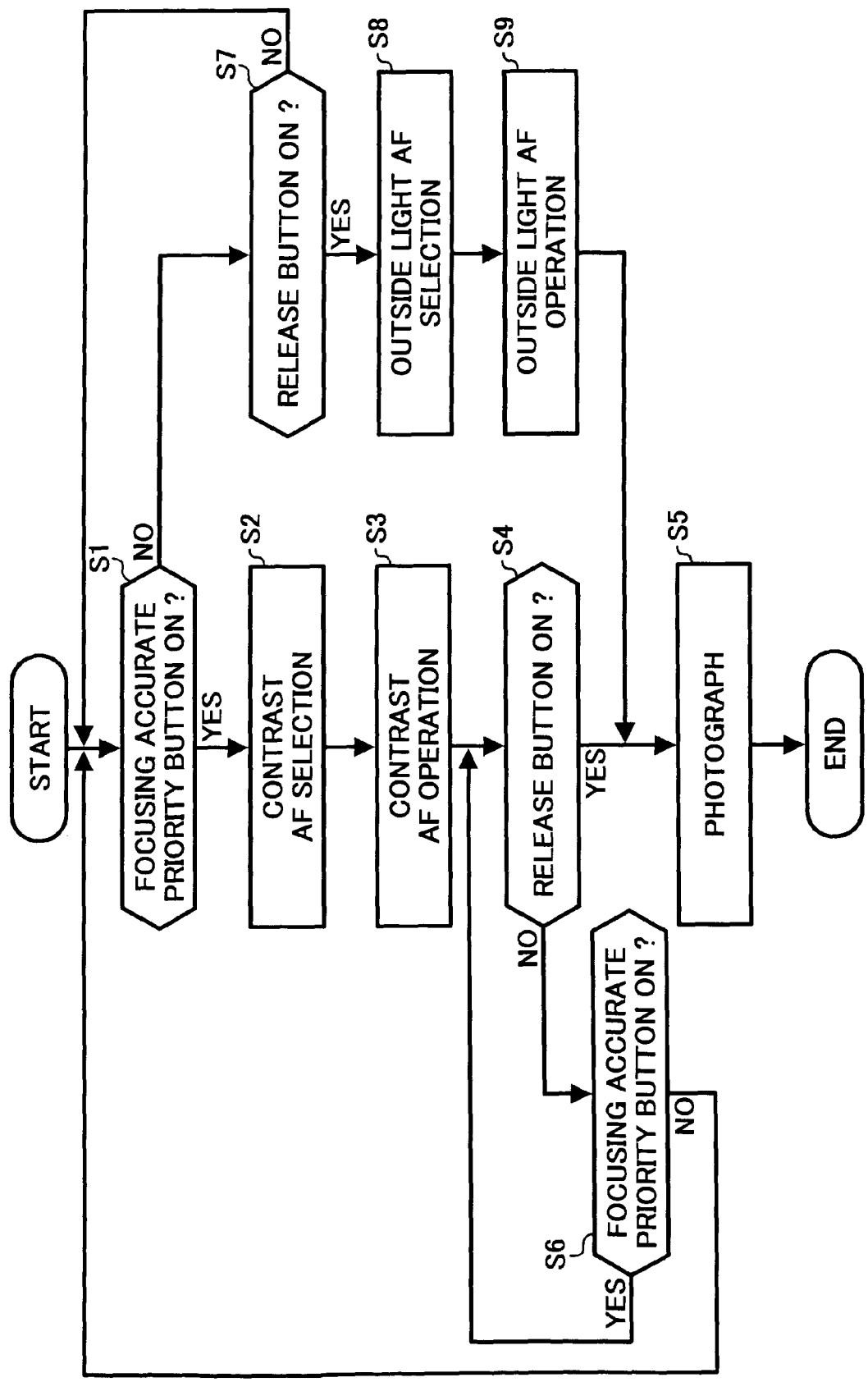
FIG. 3 is a flow chart explaining an operation of the auto focusing apparatus shown in FIG. 1.

Subsequently, an operation of the auto focusing apparatus 100 and electronic camera 200 according to the present invention will be explained with reference to a flow chart as shown in FIG. 3.

The user for the electronic camera 200 on which the auto focusing apparatus 100 is mounted, first, grips the right side of the electronic camera 200 with the right hand and the left side of the electronic camera with the left hand to direct a photographic optical system including the focusing lens 100 of the electronic camera 200 gripped with two hands to a subject (not shown).

Here, the control means 50 of the auto focusing apparatus 100 is stood by for inputting either pressing of the focusing accurate priority button 40 (step 1 (hereinafter, S1)) or pressing of the release button 30 (S7).

If the subject is, for example, a still life, landscape or the like which does not move and requires an accuracy of focusing, the user judges that the focusing accuracy should be prioritized and presses the focusing accurate priority button 40 with the finger of the left hand which grips the camera.

When the focusing accurate priority button 40 is pressed (S1), a command for selecting the contrast AF operation is input to thus input the command into the control means 50.

The control means 50 selects the contrast AF operation of the AF operations by receiving the selected command of the contrast AF operation (S2).

By the selection, the control means 50 then outputs a signal for commanding the starting of the contrast AF operation.

The contrast AF means 10 receiving the command starts the contrast AF operation (S3).

In other words, the contrast AF means commands the stepping motor 130 to move the focusing lens 110 along the optical axis and receives sequentially an image signal displaying the subject image L projected on the CCD120 through the moving focusing lens 110, from the CCD120, and computes sequentially an evaluated value for evaluating the contrast of the subject image L, based on the sequentially received image signal, and detects a position (focusing position) of the focusing lens 110 at the time of the maximum evaluated value while comparing the sequentially obtained evaluated values.

Here, when the evaluated value of the contrast becomes maximum, it is meant that the subject image L is focused on the CCD120 in a high accuracy.

In this way, the contrast AF means 10 sends a command for stopping movement of the focusing lens 110 to the stepping motor 130 by moving the focusing lens 110 in the focusing position obtained with the detection and the stepping motor 130 stops the movement of the focusing lens 110 by receiving the stopping command.

As a result, the subject image L is focused on the CCD120 in a high accuracy and the contrast AF operation (S3) is completed.

As the contrast AF operation (S3) is completed, the control means 50 is stood by to input either the focusing accurate priority button 40 is again pressed (S6) or the release button 30 is pressed (S4), for confirmation.

Inputting of the signal by pressing of the focusing accurate priority button 40 in the step 6 (S6) is not operation for selecting the contrast AF operation, different from the pressing of the focusing accurate priority button 40 in the step 1

(S1), but is operation to cause a focusing state of the subject image L displayed on a monitor screen (not shown) provided in a back side of the electronic camera 200 to make confirmation to the user.

In other words, the subject image L focused on the CCD 120 by the contrast AF operation in the above step 3 (S3) should be an image having a high focusing accuracy, but may be focused on a scene to which the user is not intended.

Consequently, the subject image L or a reduced image of the subject image L is displayed on the monitor screen based on the image signal obtained by the CCD120, and when the user judges that the displayed image may be photographed as is by making the image observe to the user, inputting of the confirmed signal is then carried out by causing the user to press the focusing accurate priority button 40 (S6), next, an actual photograph is performed (S5) by the release button 30 being pressed (S4) and then the processing is completed.

An inputting standby routine for at least few seconds is set to judge about whether the focusing accurate priority button 40 is pressed or not in the step 6 (S6), (not shown). This functions to prevent the processing from returning instantaneously to the original step 1 (S1) when the release button 30 is not pressed (S4) at the time that the contrast AF operation is completed (S3) and the focusing accurate priority button is not pressed (S6).

On the other hand, if the input of the confirmed signal to the displayed image in the step 6 (S6) is not performed in the few seconds for the inputting standby, namely, the user desires again the focusing operation, a processing for standby of pressing the focusing accurate priority button 40 or release button 30 is carried out by returning to the original step 1 (S1).

Subsequently, if the subject is, for example, a driving automobile, moving animal or the like and focusing speed is desired than focusing accuracy, the user judges that the focusing speed should be prioritized (hereinafter referred as to time lag priority) and the release button 30 is pressed (S1, S7) without the focusing accurate priority button 40 being pressed.

In this way, when the release button 30 is pressed without the focusing accurate priority button 40 being pressed, the command for photographic starting is input into the control means 50 from the release button 30 and then the control means 50 selects the outside light AF operation as AF operation (S8).

Next, by the selection, the control means 50 outputs a signal for commanding the starting of the outside light AF operation to the outside light AF means 20.

The outside light AF means 10 receiving the command starts the outside light AF operation (S9).

Accordingly, it is possible to project infrared light, for example, to the subject, to measure distance to the subject based on arriving time (case of active AF) of reflected light L' of the infrared light from the subject or phase difference (case of passive AF) to compute a position of the focusing (focusing position) lens 110 for focusing the subject image which is in the distance (distance value) obtained by the above measurement on the CCD120 and the move the focusing lens 110 to the obtained focusing position.

Consequently, the subject image L is focused accurately on the CCD120 and then the outside light AF operation (S9) is completed.

When the outside light AF operation (S9) is completed, the actual photograph is carried out (S5) and the processing is completed.

In this way, according to the auto focusing apparatus 100 in the embodiment of the present invention, the contrast AF operation capable of obtaining the image having high focusing accuracy is performed when the focusing accurate priority button 40 is pressed before the release button 30 is pressed, the focusing operation for prioritizing time lag is performed when the release button is pressed for normal photographic operation without the focusing accurate priority button 40 being pressed, it is therefore possible to obtain an image according to each focusing operation.

Accordingly, even in a case that a bird or the like appears when the user desires to photograph a still life, for example, instantaneously, the subject must be changed to the bird, the user can perform the photograph with selection of high speed focusing operation (time lag priority focusing operation) suitable to the flying bird only by pressing the release button 30 which performs the normal photographic manipulation without any additional operation of the user.

The control means 50 in the embodiment does not select each of the contrast and outside AF means 10 and 20, but selects contrast and outside AF operations based on whether or not the focusing accurate priority button 40 is pressed before the release button 30 is pressed, default setting.

It is not necessary to select always each AF operation in the first and second auto focusing means according to the present invention, as shown in this embodiment.

In other words, the outside light AF operation by the outside light AF means 20 is default setting, the control means 50 may be switched from the outside light AF operation being the default setting to the contrast AF operation only when the focusing accurate priority button 40 is pressed before the release button 30 is pressed. Note that in one embodiment of the auto focusing apparatus 100 according to the present invention, the outside light AF means 20, contrast AF means 10, focusing accurate priority button 40 and control means 50 correspond to the first auto focusing means, second auto focusing means, inputting means for second auto focusing signal and control means, respectively.

In the other embodiment of the auto focusing apparatus 100, the outside light AF means 20, contrast AF means 10, focusing accurate priority button 40, release button 30 and control means 50 correspond to the first auto focusing means, second auto focusing means, inputting means for second auto focusing signal, inputting means for photographic starting signal and control means, respectively.

Further, the electronic camera 200 on which the auto focusing apparatus 100 according to the present invention as described above is mounted corresponds to one embodiment of an image inputting apparatus according to the present invention.

Embodiment 2

Figure 4:
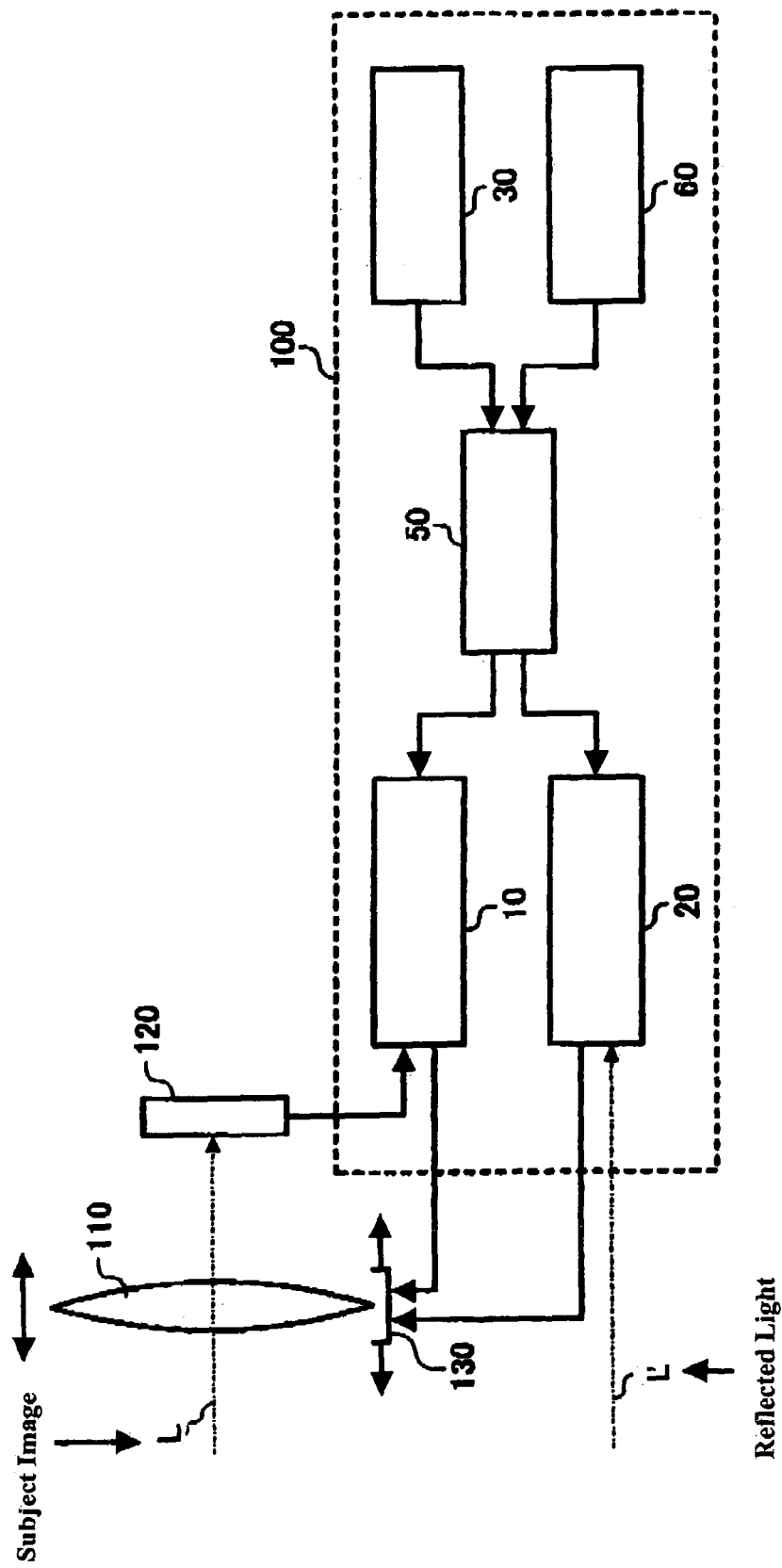
FIG. 4 is a block view showing one embodiment of the auto focusing apparatus in third and fourth aspects according to the present invention.

An auto focusing apparatus 100 as shown in FIG. 4 comprises a contrast AF (auto focusing) means 10, an outside light AF means 20, a release button 30, a time lag priority switch (SW) 60 and a control means 50.

Here, the contrast AF means 10 and outside light AF means 20 are the same as that in the embodiment 1 and therefore a description thereof is omitted.

Figure 5A:
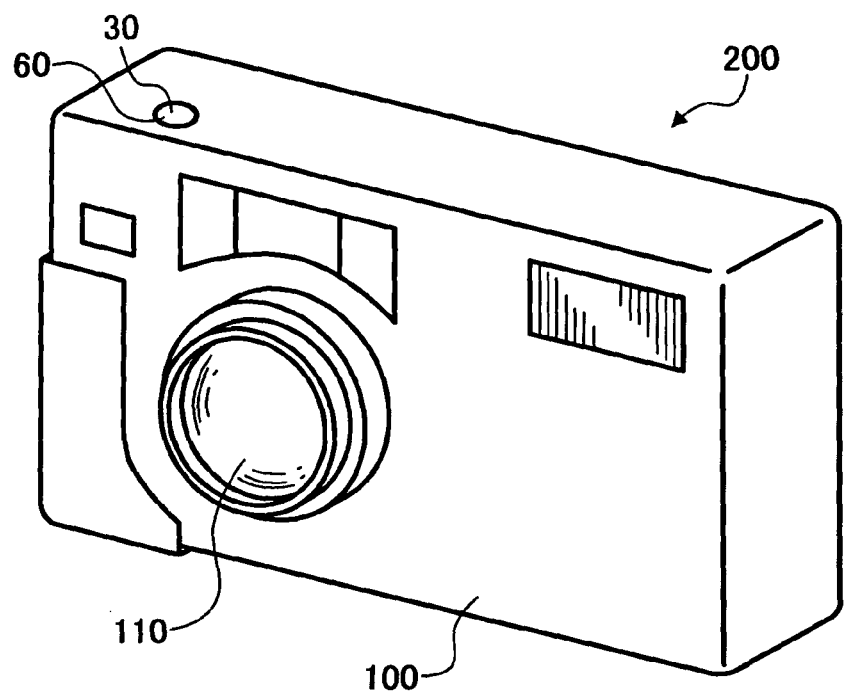
FIG. 5A is a perspective view showing the electronic camera including the auto focusing apparatus shown in FIG. 4.

The release button 30 is placed in an upper surface of and right of center of an electronic camera 200 as shown in FIG. 5A and in a position which is easy to press with the second finger in the right hand of a user who grips the electronic camera 200. A leg 30a of the release button 30 contacts a contacting point 32 (common with a contacting point 62 as described hereinafter) and a contacting point 31 by pressing of the release button 30 by the user to generate a command for photographic starting.

Figure 5B:
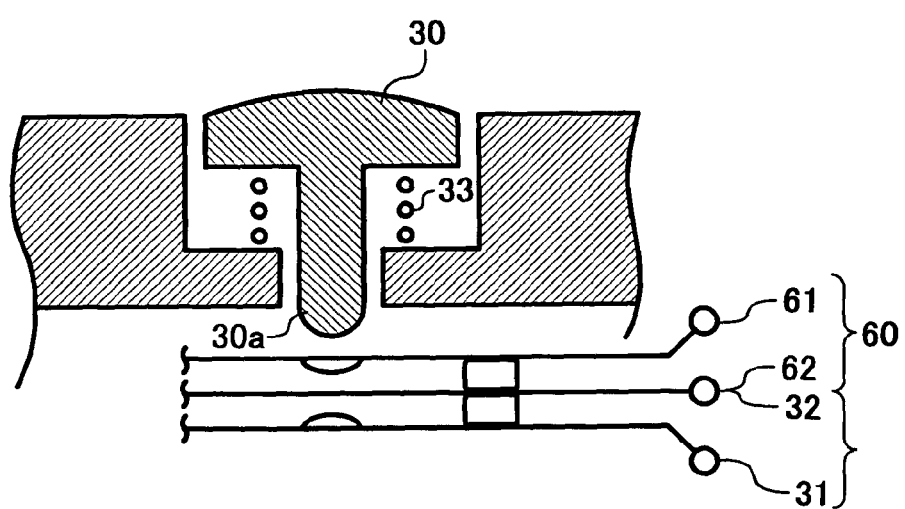
FIG. 5B is a partial sectional view showing a release button and contacting points.

The time lag priority SW 60 is provided in the release button 30 as shown in FIG. 5B. The time lag priority SW 60 is set so that when the release button 30 is pressed by the user, prior to input of the photographic starting, the leg 30a of the release button 30 contacts the contacting points 61 and 62 to input a command for selecting the outside AF operation. Inputting of the command for photographic starting is carried out on extension of the inputting of command for selecting the outside light AF operation. In FIG. 5B, reference numeral 33 denotes a return spring for the release button 30.

In other words, the contacting points 61 and 62 contact in the state that the release button 30 is half-pressed downwardly as viewed in FIG. 5B to perform the input of commanding the outside light AF operation, further the contacting points 32 (common with the contacting point 62) and 31 contact while contacting the contacting points 61 and 62 in the state that the release button 30 is full-pressed, to perform the input of commanding the photographic starting.

Consequently, when the command for photographic starting is input, the input of commanding the outside light AF operation is necessarily carried out.

The control means 50 controls the contrast and outside AF means 10 and 20 so as to select the outside light AF operation when the contacting points 61 and 62 of the time lag priority SW 60 contact in a predetermined time before the contacting points 32 and 31 of the release button 30 contact, namely, when the release button 30 is pressed within a predetermined time from a half-pressed position, to a full-pressed position, and to select the contact AF operation when the contacting points 61 and 62 of the time lag priority SW 60 do not contact in a predetermined time before the contacting points 32 and 31 of the release button 30 contact, namely, the release button 30 is pressed after a predetermined time from the half-pressed position, to the full-pressed position.

Subsequently, an operation of the auto focusing apparatus 100 according to the present invention with reference to a flow chart as shown in FIG. 6 will be explained hereinafter.

The user, first, grips the right side of the electronic camera 200 on which the auto focusing apparatus 100 is mounted, with the right hand and then a photographic optical system including an auto-focusing lens 110 of the electronic camera 200 is directed to a subject (not shown).

At this time, the control means 50 of the auto focusing apparatus 100 is stood by to contact the contacting points 61 and 62 of the time lag priority SW 60 assembled in the release button 30 (S11).

If the subject is, for example, a still life, scene or the like which does not move and focusing accuracy is required than focusing speed, the used judges that the focusing accuracy should be prioritized and then presses half the release button 30 (so-called "release lock state").

In the half-pressed state, the leg 30a of the release button 30 contacts the contacting points 61 and 62 of the time lag priority SW 60, but the contacting points 32 and 31 do not contact.

As a result, the time lag SW 60 is ON (S11), a command for selecting the outside light AF operation is input into the control means 50, and a timer provided in the control means 50 clocks an elapsed time from the input of command (S12).

From the half pressed state, until a determined time (for example, 0.1 second) is elapsed, the release button 30 is pressed further to the full pressed position to judge whether the contacting points 31 and 32 are contacted (S13).

Subsequently, when the contacting points 31 and 32 are contacted until the determined time us elapsed, namely, the command for photographic starting is not input, the control means 50 selects the contrast AF operation (S18) and outputs a signal for commanding the starting of the AF operation to the contrast AF means 10.

The contrast AF means 10 receiving this command starts the contrast AF operation (S19).

When the contrast AF operation is completed by the same operation as in the embodiment 1, the contacting points 31 and 32 are stood by to contact to each other by further pressing of the release button 30 (S20).

When the contacting points 31 and 32 are contacted by further pressing of the release button 30 (S17), the actual photograph is performed and the processing is completed.

Because an image photographed by the processing flow is based on the contrast AF operation realizing a high accurate focusing, the image has a high focusing accuracy.

On the other hand, if the subject is, for example, a driving automobile, a moving animal or the like and the focusing speed is required than the focusing accuracy, the user judges that the time lag should be prioritized and presses the release button 30 at a stretch until the contacting points 31 and 32 are contacted (S11, S12, S13, S14).

In this case, because the release button 30 is further pressed before the determined time is elapsed after the half-pressed state of the release button 30 in the step 11 (S11) and the contacting points 31 and 32 are contacted (S13, S14), the processing of the steps 11 to 14 (S11 to S14) is executed continuously in very short time and the command for photographic starting is input by means of the contact of the contacting points 31 and 32.

By means of the command, the control means 50 selects the outside light AF operation as the AF operation (S15).

Further, by means of the command, the control means 50 outputs a signal for commanding the starting the outside light AF operation to the outside light AF means 20.

The outside light AF means 10 receiving the command starts the outside AF operation (S16).

In other words, infrared light is projected to the subject to measure a distance to the subject based on a reflected light L' on the subject and a position of the focusing lens 110 (focusing position) is obtained to focus the subject image which is in a distance value obtained by the above measurement on the CCD 120 and then the focusing lens 110 is moved to the obtained position.

As a result, the subject image L is focused accurately on the CCD 120 and the outside light AF operation is completed (S16).

As the outside light AF operation (S16) is completed, the actual photograph is executed (S17), and the processing is completed.

In this way, according to the auto focusing apparatus of the present invention, the contrast AF operation capable of obtaining an image having a high focusing accuracy is performed when the contacting points 32 and 31 of the release button 30 are not contacted within a predetermined time after the contacting points 61 and 62 of the time lag priority SW 60 are contacted, and it is possible to obtain an image based on the focusing of the time lag priority when the contacting points 32 and 31 of the release button 30 within a predetermined time after the contacting points 61 and 62 of the time lag priority SW 60 are contacted, namely, only by pressing at a stretch the release button 30, similarly as a normal photographic operation.

Accordingly, even if a bird appears when a still life is desired to photograph, instantaneously, the subject is changed to the bird, the user can photograph only by pressing the release button 30 at s stretch which is a normal photographic operation without requiring any additional operation and by selecting the high speed focusing operation suitable to the moving bird.

The control means 50 in the embodiment does not select each of the contrast and outside AF means 10 in the default setting, but selects contrast AF operation or outside light AF operation according to whether or not the determined time is elapsed from the time that the time lag SW is turned ON to the time that contacting points 31 and 32 of the release button 30 are contacted.

In the auto focusing apparatus, it is not required that each AF operation is always selected in case of performing either AF operation as described above in the embodiment.

In other words, the outside light AF operation by the outside light AF means 20 is set to the default, the control means 50 may be set to change from the outside light AF operation being the default setting to contrast AF operation only when the release button 30 is not further pressed until the determined time is elapsed after the release button 30 is pressed half.

In one example of the auto focusing apparatus 100, the outside light AF means 20, contrast AF means 10, time lag priority SW 60 and control means 50 correspond to a first auto focusing means, a second auto focusing means, an inputting means for a first auto focusing signal and control means, respectively.

In the other example of the auto focusing apparatus 100, the outside AF means 20, contrast AF means 10, time lag priority SW 60, release button 30 and control means 50 correspond to the first auto focusing means, second auto focusing means, inputting means for first auto focusing signal, inputting means for photographic starting signal and control means, respectively.

In the embodiment 2, an inputting SW for auto focusing starting signal as an inputting means for auto focusing starting signal to which an command for starting either one AF operation of the outside and contrast AF operations is input may be applied in place of the time lag priority SW 60.

In other words, when the inputting SW is pressed and the command for commanding the auto focusing operation is input, either one AF operation of the contrast and outside AF operations or an operation in a sequence common with both the AF operations, of sequences in each AF operation may be executed.

It is preferable to execute a ranging operation of the outside light AF operation.

In this way, by executing previously always the ranging operation, when the release button is pressed at a stretch, the outside light AF operation may be continued as is following to the ranging operation, and also when the release button is fully pressed after the determined time is elapsed after the half pressing thereof, by use of a distance value to the subject obtained by the previously performed ranging operation, it is possible to limit a moved range of the focusing lens 110 in the contrast AF operation to a narrow range corresponding to the distance value by use of and to accomplish reduction of time of the contrast AF operation.

The construction comprising the inputting SW for auto focusing starting signal in place of the time lag priority SW may be applied to the fifth or sixth aspect of the auto focusing apparatus.

The electronic camera including the auto focusing apparatus in each embodiment as described above may be applied to the image inputting apparatus in the second aspect of the present invention.

According to the present invention, with the above construction, the following advantageous effects are exercised.

According to the first aspect of the present invention, because the auto focusing operation for focusing speed priority is established basically, which is switched to the auto focusing operation for focusing accurate priority if the photographing manipulation is carried out after a predetermined selecting operation is executed, if the usual photographic operation is carried out without the user performing previously an additional operation (inputting operation for selected command to the inputting means for second auto focusing signal), it is possible to prevent a chance of photographic timing from losing since the high speed focusing operation is executed to carry out the photograph.

On the other hand, if the high accurate focusing is required, because there is a sufficient time for performing the previous additional operation by the user, it is possible to obtain an image having high focusing accuracy by carrying out the high accurate focusing operation.

According to the second aspect of the present invention, because the auto focusing operation for moving the focusing lens based on ranging is set basically, if the photographic operation is performed after a predetermined selecting operation is performed, the auto focusing operation is switched to the auto focusing operation based on the image signal obtained actually by the focusing lens, if the user performs the usual photographic operation (inputting for the photographic starting command to the inputting means for photographic starting signal) without carrying out the a previous additional operation (inputting operation for selected command to the inputting means for second auto focusing signal), it is possible to prevent the photographic timing from losing since the high speed focusing is carried out and to obtain an image having high focusing accuracy since the high accurate focusing operation is accomplished by carrying out the additional operation.

According to the auto focusing apparatus in the third aspect of the present invention, because the auto focusing operation for focusing speed priority is set basically, if the photographic operation is not carried out within a predetermined time after the predetermined selected operation is performed, the focusing speed priority is switched to the auto focusing operation of focusing accurate priority, it is possible to prevent the photographic timing from losing since the high speed focusing operation is carried out only by performing the normal photographic operation within a very short time (a predetermined time) without sensing to input the selected command into the inputting means for first auto focusing signal.

According to the auto focusing apparatus in a fourth aspect of the present invention, because if a predetermined selected operation is performed within a predetermined time prior to the photographic operation, the auto focusing apparatus is adapted to switch to the auto focusing operation for moving the focusing lens in the focusing position corresponding to the distance to the subject, it is possible to prevent the photographic timing from losing since the high speed focusing operation is carried out only by performing the normal photographic operation within a very short time (a predetermined time) without sensing to input the selected command into the inputting means for first auto focusing signal. It is also possible to enhance the operationality since the user is not erroneous the operation instantaneously due to inputting of the selected command of the first auto focusing operation, even if the high speed focusing operation is desired immediately.

According to the auto focusing apparatus in the fifth aspect of the present invention, because when the command for starting auto focusing operation is input into the inputting means for auto focusing starting signal, first or second auto focusing operation is started temporarily and if the photographic operation is performed within a predetermined time after the auto focusing operation is started, auto focusing operation for focusing speed priority is selected, it is possible to prevent the photographic timing from losing since the high speed focusing operation is carried out only by performing the normal photographic operation within a very short time (a predetermined time) without sensing to input the selected command into the inputting means for auto focusing signal.

On the other hand, if the high accurate focusing is required, the photographic operation is performed at the elapse of a predetermined time after the starting command is input into the inputting means for auto focusing starting signal and therefore the high accurate focusing operation is performed to obtain an image having high focusing accuracy.

According to the auto focusing apparatus in the sixth aspect of the present invention, when the command for starting auto focusing operation is input into the inputting means for auto focusing starting signal, the first or second auto focusing operation is started temporarily and when photographic operation is carried out within a predetermined time from the operation of starting the above auto focusing operation, the auto focusing operation (first auto focusing operation) for moving the focusing lens in the focusing position corresponding to ranging of the distance to the subject is selected.

With such a construction, it is possible to perform the inputting of starting command of the auto focusing operation into the inputting means for auto focusing starting signal and the inputting of command for photographic starting to the inputting means for photographic starting signal, as one united continuous operation. Consequently, it is possible to carry out the inputting of command for photographic starting within a very short time from the inputting of starting command of the auto focusing operation.

Accordingly, even if high speed focusing operation is desired instantaneously, the user can perform the inputting of starting command of the auto focusing operation by carrying out the inputting operation of command for usual photographic starting without erring the immediate operation by the user.

As a result, operationality for the auto focusing apparatus effectively can be enhanced.

According to the image inputting apparatus in the first aspect of the present invention, it is possible to obtain an image inputting apparatus having the operation and advantageous effect of the auto focusing apparatus. It is possible to input a command into the inputting means for second auto focusing signal without separating the hand gripping the image inputting apparatus (electronic camera or the like) therefrom, since the inputting means for second auto focusing signal is provided in a range of contacting with a finger in the hand of the user and to switch the auto focusing operation properly without losing the operationality.

According to the image inputting apparatus in the second aspect of the present invention, it is possible to obtain an image inputting apparatus having the operation and advantageous effect of the auto focusing apparatus according to the present invention, as described above.

What is claimed is:

1. An auto focusing apparatus, comprising:
   first auto focusing means for carrying out a first auto focusing operation in which a focusing speed is faster than that of a second auto focusing operation; said first and second auto focusing operations being mutually different in said focusing speed and a focusing accuracy;
   second auto focusing means for carrying out said second auto focusing operation in which the focusing accuracy is higher than that of said first auto focusing operation;
   inputting means for a photographic starting signal in which a command for photographic starting is input;
   inputting means for an auto focusing starting signal in which a command for starting said auto focusing operations is input; and
   control means for determining a focusing position based on a focusing result of the first auto focusing means when said command for the photographic starting is input into said inputting means for said photographic starting signal within a previously set predetermined time after the command for starting the auto focusing operation is input into the inputting means for said auto focusing starting signal, and for determining a focusing position based on a focusing result of the second auto focusing means when the command for the photographic starting is not input into the inputting means for the photographic starting signal within the previously set predetermined time after the command for starting the auto focusing operation is input to the inputting means for the auto focusing starting signal.

2. An auto focusing apparatus according to claim 1, wherein said inputting means for said auto focusing starting signal is placed in juxtaposition to said inputting means for said photographic starting signal so that the command for starting said auto focusing operation is input, in conjugation with an inputting operation of the command for the photographic starting to the inputting means for the photographic starting signal.

3. An auto focusing apparatus, comprising:
   first auto focusing means for carrying out a first auto focusing operation according to a distance value obtained by measuring a distance to a subject;
   second auto focusing means for carrying out a second auto focusing operation according to an evaluation of an image of subject obtained through a focusing lens while moving the focusing lens;
   inputting means for a photographic starting signal in which a command for photographic starting is input;
   inputting means for an auto focusing starting signal in which a command for starting the auto focusing operations is input; and
   control means for determining a focusing position based on a focusing result of the first auto focusing means when the command for the photographic starting is input into said inputting means for said photographic starting signal within a previously set predetermined time after said command for starting the auto focusing operation is input into said inputting means for said auto focusing starting signal, and for determining a focusing position based on a focusing result of the second auto focusing means when the command for the photographic starting is not input into said inputting means for said photographic starting signal within the previously set predetermined time after said command for starting the auto focusing operation is input into said inputting means for said auto focusing starting signal.

4. An auto focusing apparatus according to claim 3, wherein said inputting means for said auto focusing starting signal is placed in juxtaposition to said inputting means for said photographic starting signal so that the command for starting said auto focusing operation is input, in conjugation with an inputting operation of the command for the photographic starting to the inputting means for the photographic starting signal.

5. An image inputting apparatus, comprising:
an auto focusing apparatus, including:
first auto focusing means for carrying out a first auto focusing operation in which a focusing speed is faster than that of a second auto focusing operation;
said first and second auto focusing operations being mutually different in said focusing speed and a focusing accuracy;
second auto focusing means for carrying out the second auto focusing operation in which the focusing accuracy is higher than that of said first auto focusing operation;
inputting means for a photographic starting signal in which a command for photographic starting is input;
inputting means for an auto focusing starting signal in which a command for starting said auto focusing operation is input; and
control means for determining a focusing position based on a focusing result of the first auto focusing means when said command for the photographic starting is input into said inputting means for said photographic starting signal within a previously set predetermined time after the command for staring the auto focusing operation is input into the inputting means for said auto focusing starting signal, and for determining a focusing position based on a focusing result of the second auto focusing means when the command for the photographic starting is not input into the inputting means for the photographic starting signal within the previously set predetermined time after the command for starting the auto focusing operation is input to the inputting means for the auto focusing starting signal.

6. An image inputting apparatus, comprising:
an auto focusing apparatus, including:
first auto focusing means for carrying out a first auto focusing operation according to a distance value obtained by measuring a distance to a subject;
second auto focusing means for carrying out a second auto focusing operation according to an evaluation of an image of subject obtained through a focusing lens while moving the focusing lens;
inputting means for a photographic starting signal in which a command for photographic starting is input;
inputting means for an auto focusing starting signal in which a command for starting said auto focusing operation is input; and
control means for determining a focusing position based on a focusing result of the first auto focusing means when said command for the photographic starting is input into said inputting means for said photographic starting signal within a previously set predetermined time after said command for starting the auto focusing operation is input into said inputting means for said auto focusing starting signal, and for determining a focusing position based on a focusing result of the second auto focusing means when the command for the photographic starting is not input into said inputting means for said photographic starting signals within the previously set predetermined time after said command for starting the auto focusing operation is input into said inputting means for said auto focusing starting signal.

7. An auto focusing apparatus, comprising:
a first auto focusing device to carry out a first auto focusing operation in which a focusing speed is faster than that of a second auto focusing operation;
said first and second auto focusing operations being mutually different in said focusing speed and a focusing accuracy;
a second auto focusing device to carry out said second auto focusing operation in which the focusing accuracy is higher than that of said first auto focusing operation;
an inputting device for a photographic starting signal in which a command for photographing starting is input;
an inputting device for an auto focusing starting signal in which a command for starting said auto focusing operation is input; and
a control device to determine a focusing position based on a focusing result of the first auto focusing device when said command for the photographic starting is input into said inputting device for said photographic starting signal within a previously set predetermined time after the command for starting the auto focusing operation is input into the inputting device for said auto focusing starting signal, and to determine a focusing position based on a focusing result of the second auto focusing device when the command for the photographic starting is not input into the inputting device for the photographic starting signal within the previously set predetermined time after the command for starting the auto focusing operation is input to the inputting device for the auto focusing stating signal.

8. An auto focusing apparatus according to claim 7, wherein said inputting device for said auto focusing starting signal is placed in juxtaposition to said inputting device for said photographic starting signal so that the command for starting said auto focusing operation is input, in conjugation with an inputting operation of the command for the photographic starting to the inputting device for the photographic starting signal.

9. An auto focusing apparatus, comprising;
a first auto focusing device to carry out a first auto focusing operation according to a distance value obtained by measuring a distance to a subject;
a second auto focusing device to carry out a second auto focusing operation according to an evaluation of an image of subject obtained through a focusing lens while moving the focusing lens;
an inputting device for a photographic starting signal in which a command for photographic starting is input;
an inputting device for an auto focusing starting signal in which a command for starting the auto focusing operations is input; and
a control device to determine a focusing position based on a focusing result of the first auto focusing device when the command for the photographic starting is input into said inputting device for said photographic starting signal within a previously set predetermined time after said command for starting the auto focusing operation is input into said inputting device for said auto focusing starting signal, and to determine a focusing position based on a focusing result of the second auto focusing device when the command for the photographic starting is not input into said inputting device for said photographic starting signal within the previously set predetermined time after said command for starting the auto focusing operation is input into said inputting device for said auto focusing starting signal.

10. An auto focusing apparatus according to claim 9, wherein said inputting device for said auto focusing starting signal is placed in juxtaposition to said inputting device for said photographic starting signal so that the command for starting said auto focusing operation is input, in conjugation with an inputting operation of the command for the photographic starting to the inputting device for the photographic starting signal.

11. An image inputting apparatus, comprising:
an auto focusing apparatus, including:
a first auto focusing device to carry out a first auto focusing operation in which a focusing speed is faster than that of a second auto focusing operation;
said first and second auto focusing operations being mutually different in said focusing speed and a focusing accuracy;
a second auto focusing device to carry out the second auto focusing operation in which the focusing accuracy is higher than that of said first auto focusing operation;
an inputting device for a photographic starting signal in which a command for photographic starting is input;
an inputting device for an auto focusing starting signal in which a command for starting said auto focusing operation is input; and
a control device to determine a focusing position based on a focusing result of the first auto focusing device when said command for the photographic starting is input into said inputting device for said photographic starting signal within a previously set predetermined time after the command for starting the auto focusing operation is input into the inputting device for said auto focusing starting signal, and to determine a focusing position based on a focusing result of the second auto focusing device when the command for the photographic starting is not input into the inputting device for the photographic starting signal within the previously set predetermined time after the command for starting the auto focusing operation is input to the inputting device for the auto focusing starting signal.

12. An image inputting apparatus comprising:
an auto focusing apparatus, including:
a first auto focusing device to carry out a first auto focusing operation according to a distance value obtained by measuring a distance to a subject;
a second auto focusing device to carry out a second auto focusing operation according to an evaluation of an image of subject obtained through a focusing lens while moving the focusing lens;
an inputting device for a photographic starting signal in which a command for photographic starting is input;
an inputting device for an auto focusing starting signal in which a command for starting said auto focusing operation is input; and
a control device to determine a focusing position based on a focusing result of the first auto focusing device when said command for the photographic starting is input into said inputting device for said photographic starting signal within a previously set predetermined time after the command for starting the auto focusing operation is input into the inputting device for said auto focusing starting signal, and to determine a focusing position based on a focusing result of the second auto focusing device when the command for the photographic starting is not input into the inputting device for the photographic starting signal within the previously set predetermined time after the command for starting the auto focusing operation is input to the inputting device for the auto focusing starting signal.

* * * * *